(12) United States Patent
Roberts et al.

(10) Patent No.: US 7,352,356 B2
(45) Date of Patent: Apr. 1, 2008

(54) REFRESHABLE SCANNING TACTILE GRAPHIC DISPLAY FOR LOCALIZED SENSORY STIMULATION

(75) Inventors: John W. Roberts, Damascus, MD (US); Nicholas Guttenberg, Gaithersburg, MD (US)

(73) Assignee: United States of America, Washington, DC (US)

( * ) Notice: Subject to any disclaimer, the term of this patent is extended or adjusted under 35 U.S.C. 154(b) by 885 days.

(21) Appl. No.: 10/317,930

(22) Filed: Dec. 12, 2002

(65) Prior Publication Data

US 2003/0117371 A1 Jun. 26, 2003

Related U.S. Application Data

(60) Provisional application No. 60/346,152, filed on Jan. 3, 2002, provisional application No. 60/339,962, filed on Dec. 13, 2001.

(51) Int. Cl.
*G09G 5/00* (2006.01)
(52) U.S. Cl. .................. 345/156; 345/173; 434/112
(58) Field of Classification Search ........ 345/156–166, 345/173–179; 434/112–114; 463/36–40; 340/825.19
See application file for complete search history.

(56) References Cited

U.S. PATENT DOCUMENTS

| | | | |
|---|---|---|---|
| 2,521,338 A | 9/1950 | Bryce et al. | |
| 2,549,632 A | 4/1951 | Nottingham | |
| 3,624,772 A | 11/1971 | Grunwald | |
| 3,736,672 A | 6/1973 | Skewis et al. | |
| 4,500,293 A | 2/1985 | Eltgen | |
| 4,551,102 A | 11/1985 | Meinzer | |
| 4,650,352 A | 3/1987 | Eriksson | |
| 5,195,894 A | 3/1993 | Le Blanc et al. | |
| 5,912,660 A * | 6/1999 | Gouzman et al. | 345/163 |
| 6,109,922 A | 8/2000 | Litschel et al. | |
| 6,354,839 B1 | 3/2002 | Schmidt et al. | |
| 6,462,840 B1 * | 10/2002 | Kravtsov | 358/474 |
| 6,535,201 B1 * | 3/2003 | Cooper et al. | 345/173 |
| 6,639,582 B1 * | 10/2003 | Shrader | 345/156 |
| 2002/0045151 A1 | 4/2002 | Roberts et al. | |
| 2002/0080111 A1 * | 6/2002 | Lake et al. | 345/156 |

* cited by examiner

*Primary Examiner*—Lun-Yi Lao
(74) *Attorney, Agent, or Firm*—Harold A. Burdick (57) ABSTRACT

Pressure-based refreshable scanning tactile graphic display apparatus and methods are disclosed for localized sensory stimulation. The apparatus include a display array having stimulus points embedded in a matrix, an energy source applied at the stimulus points through a modulator, a control unit, and a position sensing and feedback unit or units (such as a mouse-type device or data glove, for example). The energy source is preferably stored and pressurized fluid with application to selected stimulus points (pins, for example) preferably directed at a microvalve array under the control of a computer-based control unit.

7 Claims, 4 Drawing Sheets

REFRESHABLE SCANNING TACTILE GRAPHIC DISPLAY FOR LOCALIZED SENSORY STIMULATION

RELATED U.S. PROVISIONAL PATENT APPLICATIONS

This application claims the benefit of U.S. Provisional Patent Application No. 60/339,962, filed Dec. 13, 2001, this application including all the written description of the inventions described therein and making claim to the inventions therein disclosed, and U.S. Provisional Patent Application No. 60/346,152, filed Jan. 3, 2002, this application including portions of the written description pertaining to certain ones of the inventions described therein and making claim to those inventions.

FIELD OF THE INVENTION

This invention relates to tactile display apparatus and methods, and, more particularly, relates to graphic tactile display apparatus and methods.

BACKGROUND OF THE INVENTION

The human-computer interface is an important aspect of information technology. The transfer of information from human user to information system (for example, by keyboard or mouse) and the transfer of information from information system to human user (for example, by visual display or printer) are critical for efficient human use of the information system. Engaging one or more of the human senses accomplishes information transfer to the user. Visual display is the most common output of current computer systems (computer monitors, printer, lights on an instrument panel, etc.), but other sensory stimuli are increasingly being used, for example audio output of synthesized or recorded speech, alarm bells, and the like. Having more than just visual sensory output available allows a designer to more closely match the system output to the needs of a particular situation. In some cases a combination of output formats (for example, simultaneous video and audio output) will be more effective than any single format.

Human-computer interface outputs, which may more generically be called display formats, have more recently come to include those which engage the human sense of touch, both the detailed tactile sense of touch (Braille displays) and the forces involved in large body movements (force feedback or haptic systems). Braille is used to provide a reading experience for blind and visually impaired users. Haptic systems are typically used in virtual reality applications that engage multiple senses for more realistic recreation of a virtual world, and for real-world application such as remote control of robots (teleoperation).

Braille output from information systems is available in two formats: non-refreshable and refreshable. An example of a non-refreshable output is a printed (embossed) sheet of paper that has patterns of raised dots pressed into the paper to represent Braille characters. Printed Braille uses a consumable material (the paper) that is not reused. Refreshable Braille has a surface with dots that can be raised or lowered under computer control to form the Braille characters, so that the same surface can be reused many times for different text, comparable to the way in which a visual computer monitor can be used to display many images on the same surface without consuming any materials.

Braille is suitable for the reading of text, and alternative Braille codes have been devised to allow reading of mathematical expressions and musical notation. However, many blind and visually impaired individuals also have a need for touch-based or tactile graphics, in which the sense of touch can be used to experience two-dimensional or three-dimensional imagery. Tactile graphics is most commonly used to portray line drawings, textures, and to some extent generic pictures, where differences in tactile characteristics are used to portray differences in an image. Tactile graphics is important in learning (for example, graphs of mathematical functions), in design (for example, artistic or engineering design work), and in entertainment and art appreciation. Many web pages convey important information in an image format, which can be represented by tactile graphics. Tactile graphics is currently available in non-refreshable format. A number of commercially available devices can produce tactile graphics by pressing a pattern into a heavy sheet of paper or plastic, by heating a sheet of plastic that deforms when heated to form a raised pattern, or by depositing a material onto a sheet to form a pattern. All of these methods are effective, but they consume materials for every page printed. Non-refreshable tactile material is very bulky compared to visual printed material, and storage of a large number of printouts becomes a problem. Furthermore, the cost of materials is substantial, making applications that require many images (such as design, study, and web browsing) very expensive. These problems could be avoided by the availability of a refreshable tactile graphic display that would allow the same tactile surface to be used over and over for many tactile graphic images. Unfortunately, using the conventional method for tactile output, this would require a two-dimensional array large enough to show reasonably complex images, and a high enough area density of pins or other stimulus devised to provide an acceptable level of realism. For example, the user should be able to feel a displayed straight or curved line, and be able to mentally interpret it as a continuous straight or curved line rather than a collection of unrelated points—an example might be ten to twenty pins per linear inch, with several thousand pins as a minimum count for the entire display. Again by conventional design, a separate actuator drives each pin (commercial Braille displays, for example, use piezoelectric actuators), and the cost of thousands of very small actuators (at least several dollars each) puts the possibility of tactile graphic display traditionally designed beyond the financial means of almost all potential users.

The detailed human sense of touch is a scanning process. If a fingertip or other body part rests motionless on a surface, only a low resolution tactile image is perceived by the brain. If a fingertip slides across a surface, however, the changes in pressure against the skin caused by irregularities of the surface being felt scan across the surface of the skin, and the brain uses these perceived tactile impressions, combined with knowledge of the motion of the finger or the surface, to build up a mental model of the extended surface.

Since, heretofore, the scanning nature of the human sense of touch has meant that an extended surface display is necessary for the representation of an extended object, given the attendant difficulties noted above for extended graphic displays of conventional design further development could be utilized and this work has begun. For example, fixed displacement-based technology by Orbital Research uses microvalves that direct air to inflate small elastic balloons intended for use in an extended display for display of Braille (in a fairly low-density array). The display would, of course, remain static as the user reads it.

Johns Hopkins University has constructed a refreshable fingertip tactile graphic display for research on the sense of touch. The display uses a 20 by 20 pin array of stimulus points at 0.5 mm spacing, with a large multi-position linear actuator for each pin, and mechanical concentrator (linkages) to direct the activity of all 400 actuators into a small area (approximately 1 cm square, the entire device being several feet on each side). The action of the display is based upon controlled displacements of the pins at selected heights. The motors used to drive the pins have optical feedback to determine position, but this is mechanically linked to the driving source. The design is bulky and expensive, with pin operation based on fixed displacement.

Devices intended for accessibility applications have also been heretofore suggested and/or utilized. The VIRTOUCH VIRTUAL MOUSE uses three fixed displacement-based (4-level selection) 8×4 actuator fingertip arrays mounted on a computer mouse device. The arrays are driven by piezoelectric actuators, and while a user can learn to interpret tactile information (such as the tracking of the cursor across a virtual line), the spacing of the pins is several times too large to permit it to create detailed tactile sensations that would be needed for a general-purpose tactile display. Likewise, the OPTACON by Telesensory produces low resolution images using an optical scanner and a low-density array of vibrating pins to permit blind and visually impaired users to read printed or displayed text scanned by the device. The user must learn to interpret the vibration of the pins as image information (i.e., the pins do not change elevation). The use of fairly large electromechanical actuators and mechanical linkages limits the resolution of images achievable by the device.

Thus there remains a need for affordable refreshable tactile graphics for use by blind and visually impaired users, and particularly in a relatively portable and less cumbersome deployment. If the technology could also be used to improve the sense of touch in virtual reality and other related mainstream applications, this would increase the market size for the technology and drive further commercial development that would improve quality and lower the cost for both mainstream and accessibility applications.

SUMMARY OF THE INVENTION

This invention provides a refreshable scanning tactile graphic display apparatus and method for localized sensory stimulation designed so that the number of stimulus points needed is reduced from the thousands that would be needed for an extended array of conventional design, thereby lowering the cost of production of apparatus in accord with the invention. Further savings are achieved by reducing the ratio of actuators to stimulus points. Actuators disclosed herein will further reduce the cost per actuator, compared to discrete piezoelectric actuators currently in use.

The refreshable scanning tactile graphic display apparatus and system of this invention includes a display array having pressure responsive stimulus points embedded in a matrix, an energy source applied at the stimulus points through a modulator, a control unit, and, preferably, a position sensing and feedback unit.

More particularly, the apparatus for localized sensory stimulation of this invention to tactilely simulate a virtual display includes a high density array of stimulus points each capable of delivering different pressure variable stimulus at a selected body location of a user. An energy source and delivery system provide activation energy to the stimulus points, a modulator selectively activating, including varying pressure applied at, the stimulus points. A control unit controls the operation of the modulator, and a position sensing and feedback unit is preferably connected with the control unit to inform the control unit which portion of the virtual display should be tactilely simulated at the stimulus points.

The stimulus points are preferably fluid actuated and are held at a matrix for stimulating a localized area of a user's body. The modulator preferably provides an actuator array operatively associated with the stimulus points for selected application of working fluid thereto to both actuate and modulate body applied pressure at the stimulus points. The energy source and delivery system provides, in such case, for working fluid pressurization, containment and delivery.

The array of stimulus points covers only the surface of a localized area of the body (such as a fingertip, for example) for selectively stimulating the area. The individual stimulus points do not move laterally with respect to the skin at the area, and any given stimulus point always stimulates approximately the same spot on the skin. A pattern is selectively impressed on these stimulus points, and the pattern is caused to move across the surface of the skin in a uniform manner by the selective activation and deactivation of particular stimulus points in the array responsive to feedback. This stimulation of the sensors in the skin is comparable to a real patterned surface moving laterally across the skin's surface thereby creating the mental impression for the user of a real patterned surface moving across the skin.

The method of this invention for localized sensory stimulation to tactilely simulate a virtual display includes providing for delivery of stimulus at a high density set of points at a selected body location of a user. Stimulus delivery is modulated at different ones of the points for selective actuation including applying variable differential pressure stimulus at the points. Modulation is controlled responsive to selected input to control which portion of the virtual display should be tactilely simulated at the points.

It is therefore an object of this invention to provide improved graphic tactile display apparatus and methods.

It is another object of this invention to provide refreshable scanning tactile graphic display apparatus and methods.

It is still another object of this invention to provide pressure responsive refreshable scanning tactile graphic display apparatus including a display array with stimulus points embedded in a matrix, an energy source applied at the stimulus points through a modulator, a control unit, and, preferably, a position sensing and feedback unit.

It is still another object of this invention to provide a refreshable scanning tactile graphic display apparatus for localized sensory stimulation including a high density array of stimulus points each capable of delivering different pressure variable stimulus at a selected body location of a user, means for applying activation energy from an energy source to the stimulus points, a modulator for selective activation including pressure variation of the stimulus points utilizing the means for applying activation energy, and a control unit for controlling modulator operation.

It is yet another object of this invention to provide a refreshable scanning tactile graphic display apparatus for localized sensory stimulation to tactilely simulate a virtual display that includes a plurality of fluid actuated pressure variable stimulus points held at a matrix for stimulating a localized area of a user's body, an actuator array operatively associated with the stimulus points for selected application of working fluid thereto to both actuate and modulate body applied pressure at the stimulus points, a working fluid pressurization, containment and delivery system associated with the actuator array, a control unit for controlling function of the actuator array, and a position sensing and feedback unit connected with the control unit to inform the control unit which portion of the virtual display should be tactilely simulated at the stimulus points.

It is yet another object of this invention to provide a method for localized sensory stimulation to tactilely simulate a virtual display including the steps of providing for delivery of stimulus at a high density set of points at a selected body location of a user, modulating the stimulus delivery at different points for selective actuation including applying variable differential pressure stimulus at the points, and controlling the modulation responsive to selected input to control which portion of the virtual display should be tactilely simulated at the points.

With these and other objects in view, which will become apparent to one skilled in the art as the description proceeds, this invention resides in the novel construction, combination, and arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

An array of stimulus points that covers only the surface of a localized area of the body (such as a fingertip, for example) for selectively stimulating the area will be described. The individual stimulus points do not move laterally with respect to the skin at the area, and any given stimulus point always stimulates approximately the same spot on the skin. A pattern is impressed on these stimulus points (for example, if the stimulus points in the array that make up a particular pattern are activated), and the pattern is caused to move across the surface of the skin in a uniform manner by the selective activation and deactivation of particular stimulus points in the array. This stimulation of the sensors in the skin at the selected set of points at the user's body contacted by the stimulus points is comparable to a real patterned surface moving laterally across the skin's surface thereby creating the mental impression for the user of a real patterned surface moving across the skin, even though there is no real motion of the display components across the skin.

While, for purposes of the following disclosure, the display of this invention will sometimes be referred to as a "fingertip display", it should be understood that the invention could be applied to other areas of the body for localized sensory stimulation thereat (for example, for accessibility applications, the palms of the hands, soles of the feet or the upper surface of the tongue might be used).

Figure 1:
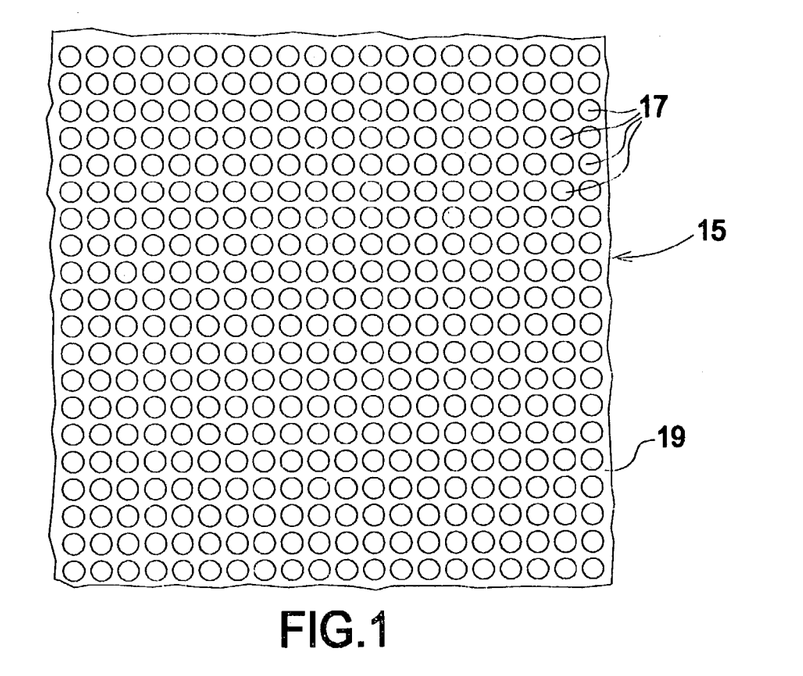
FIG. 1 is a diagrammatic illustration of a 20×20 tactile array for fingertip application (about 1 centimeter on a side)

The required resolution of stimulus points is much higher for the localized display disclosed herein than would be the case for an extended tactile graphic display (since an extended display need only create recognizable shapes that are scanned by the motion of the fingers, while the localized display herein must "trick" the senses by creating the impression of a continuous motion). The minimum density of stimulus points needed is currently felt to be within a factor of two of the density of sensors in the skin. Tactile stimulator array 15 as illustrated in FIG. 1 and deployed as set forth hereinbelow is of sufficiently high density. An array of stimulus points 17 (movable pressure responsive pins in this embodiment) is positioned in a mounting matrix 19, with pin spacing of about 0.5 mm thus providing 400 pins in a 20 pin by 20 pin array (about a one square centimeter array).

The fingertip display of this invention creates the impression of an extended tactile image by creating the illusion of the fingertip scanning across an extended surface. While a computer controlling the display could drive the apparent scanning motion of the tactile image independent of any input from the user, in practice this approach creates a poor sense of realism, and is rated poorly by users. The sense of touch is activated most realistically in a fingertip by coupling apparent motion of display array 15 to real motion of the finger, so that motion of the finger to the right, for example, results in propagation of the tactile image from right to left at array 15 (reproducing the sensation that the finger would feel when moving left to right on a real surface), with the same counter-motion principle applying to motion of the fingertip in any direction across a virtual surface.

Figure 2:
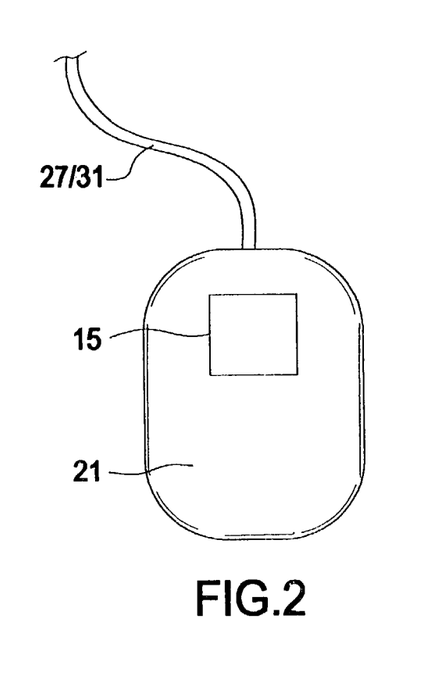
FIG. 2 is an illustration of a fingertip tactile array in accord with FIG. 1 mounted with a mouse-type tracking device.

For a flat display on a horizontal surface, this can be accomplished by mounting fingertip display array 15 on a tracking device 21 comparable to a computer mouse that senses motion of the fingertip and updates the output of array 15 accordingly (as shown in FIG. 2).

Figure 3:
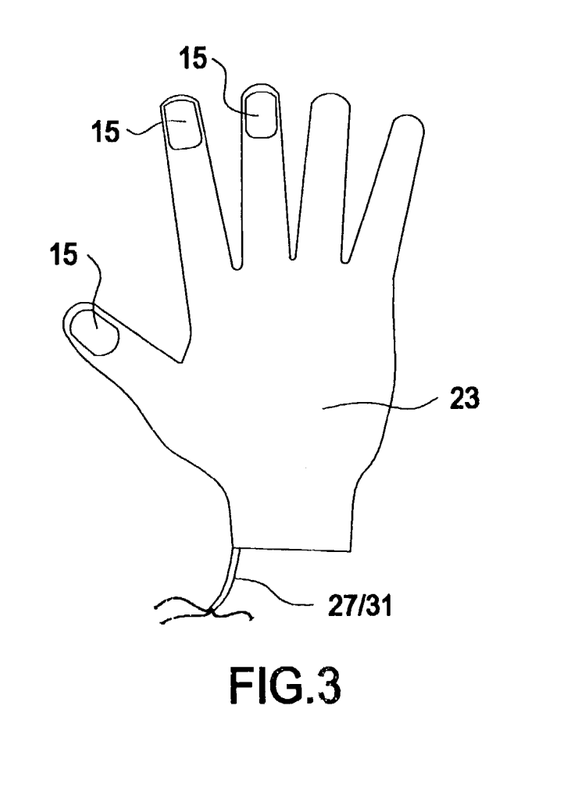
FIG. 3 is an illustration of fingertip tactile arrays in accord with FIG. 1 mounted with a data glove.

For virtual reality and augmented reality applications, a fingertip display array 15 is mounted at a finger or fingers (including the thumb) of data glove 23 (see FIG. 3). In such case, the tracking of finger motion is performed in three dimensions by normal operation of the data glove, and any time the finger touches or moves over a virtual surface in the virtual space, the fingertip array 15 produces a sensation in the finger or fingers corresponding to what should be felt by touching the surface, particularly the detailed texture and shape of the surface. Positional tracking should be sufficiently accurate to allow the material being displayed to be acceptably consistent with the position of the glove. For improved realism, a haptic display system of known design could be combined with the fingertip display array of the data glove so that the user feels not only the surface texture but also the resistance of the surface (for example, a hard surface like a rock or a soft surface like an orange). Where multiple arrays 15 are positioned at data glove 23, the tracking system must observe the spacing between the fingers and assure that the patterns displayed on these multiple fingertips are consistent with the spacing between the fingers.

Still another option for mounting of array 15 and virtual surface scanning includes utilization of a lateral pressure sensitive scanning control and feedback mechanism that can use measurement of lateral pressure of the finger or other body contact location against the mechanism (i.e., the mechanism does not physically move across a surface) to control direction and speed of scanning over the virtual surface displayed (similar in nature to the control button that is used in some notebook computers instead of a touch pad or track ball for cursor control). This implementation will provide the unique capability of allowing the lateral pressure of the display apparatus against the skin to serve in place of the lateral pressure that would be exerted against the skin by the friction of motion over a real surface. The rate of virtual motion can be adjusted to be a function of the coefficient of friction of the virtual surface and of the pressure applied by the finger perpendicular to such surface.

Stimulation of the points at the localized area of the user's body by the pins or other stimulus deployed in this invention to represent tactile information is achieved with pressure-driven stimulus rather than fixed linear displacement of pins. Pressure-based stimulus has several advantages over displacement-based stimulus. If pins are used as the stimulus, they can be made to conform to the shape of the individual user's finger by advancing the pins until the desired pressure against the finger is achieved (initially, for example, a default pressure at the default—stimulus neutral—position and thereafter as needed to convey the scanned virtual image). Stimulus can be applied using a curved or flexible surface, which would be more difficult in displacement-based systems. Reliability is greater for pressure-based stimulus; a failed stimulus point simply means one missing stimulus (i.e., no stimulus point would be likely to be stuck in an extended mode thus interfering with the sensation of other stimulus points). In the pressure-based system of this invention there is no need for a return mechanism for pins 17 unlike displacement-based systems, since the application of pressure drives the pins while the absence of pressure allows the resilience of the skin of the user to return the pin to the default, stimulus neutral, position.

Figure 4:
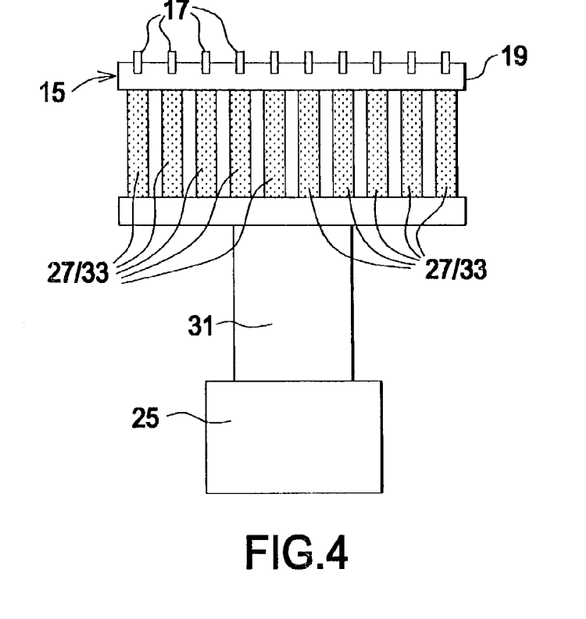
FIG. 4 is a schematic illustration of an implementation of a small area scanning tactile display (showing only a single one of the rows of stimulus points) in accord with this invention.
Figure 5:
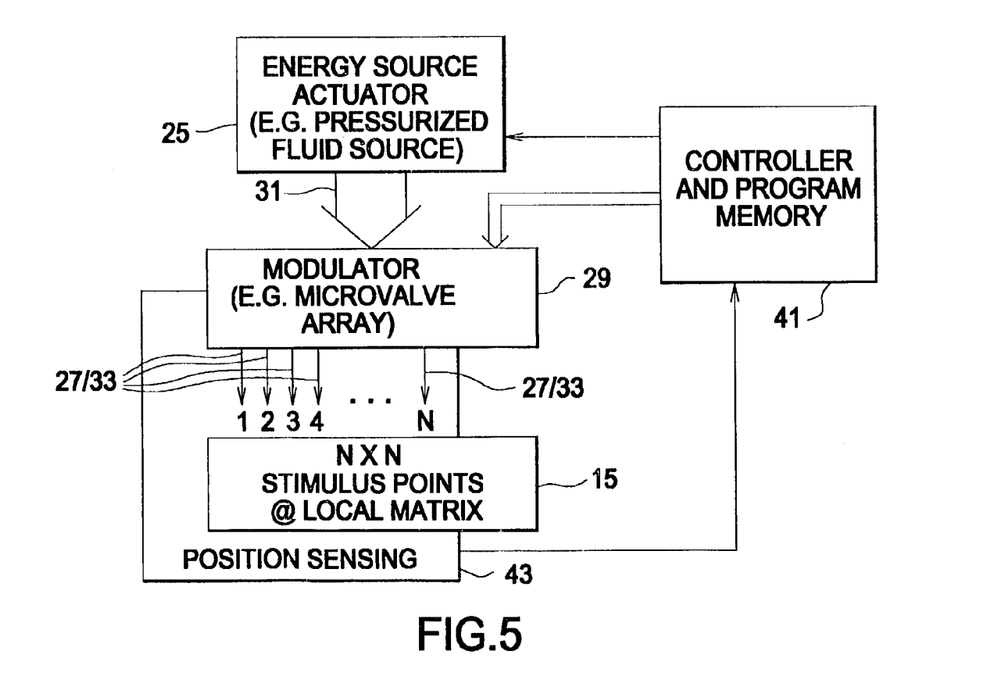
FIG. 5 another schematic illustration of the implementation of a small area scanning tactile display of FIG. 4.

Energy source 25 for a pressure-based system may take many forms, though fluid such as compressed air or other gas or liquid is preferred and allows the energy source to be some distance from fingertip display array 15. Multiple operational lines (air/liquid channels, for example) 27 can be used to operate individual stimulus points 17 of array 15 with modulator 29 (a control mechanism for operation of the various stimulus points such as a flow regulating valve array for example) being located physically remote from the user's body (at energy source 25, for example) and supplied by main (fluid supply main, for example) 31 (see FIGS. 4 and 5). Alternatively, modulator 29 might be completely local (onboard mouse-type device 21 or data glove 23) and directly associated with stimulus points 17 of array 15 at an interface complex 33 (for example, with various valves in a valve array operable directly at a cylinders' 35 inlets 37 at pin assemblies 39 of the type shown in FIG. 6), thereby making operational lines 27 unnecessary.

The pressure-based system of this invention also provides flexibility for the system to emulate other stimulus methods. For example, rapid modulation of pressure of the working fluid at stimulus points 17 will produce stimulus point vibration. Position feedback (for example capacitive readout) of stimulus point (pins, for example) positions can be used to control modulation of stimulus points to set, pre-specified displacements or refine stimulus point position, thus emulating and improving upon the function of a displacement-based display. These three types of stimulus (pressure, vibration, and displacement) can be used in combination on a pressure-based display to convey different types of tactile information (for example, with pressure used to convey information about the physical texture of a surface, vibration used to convey information such as temperature of the surface or to represent actual vibration, and set position displacement used to convey program information or identify otherwise sensory non-specific information such as a point on a graph).

Turning to FIGS. 5 through 11, particular embodiments of the pressure-based refreshable scanning tactile graphic display apparatus for localized sensory stimulation will be discussed. Basically, the apparatus and system includes a control unit 41 (preferably microprocessor based and including program memory), position sensing and feedback unit 43 (such as device 21 or glove 23) used to inform the control system of which portion of the virtual surface should be displayed, energy source 25 (working fluid storage and pressurizer, for example), channels/interface 27 and/or 31 and 33 for containment of the working fluid, modulator 29 and array 15 including stimulus points 17 embedded in matrix 19.

Preferably, energy source 25 is a storage and/or pressurization system utilizing working fluid such as filtered air. The advantages of air are apparent, including plentiful readily available supply and unimportance of minor leakage. Air may be used through ancillary channels at array 15 to control heating and humidity to limit perspiration. The ready compressibility of air can serve as a buffer to help regulate the pressure of the stimulus points against the finger or other body locale. Since compressibility limits the frequency response of the system, air channel design must take into account the maximum stimulus frequency that will be needed. Systems using large volumes of working fluid are made quite practical utilizing air and obviate the need for working fluid recovery. Systems could employ other fluids such as water or hydraulic fluid. Such liquid based systems have the advantage in applications employing high frequency operations, though leakage, inertia and fluid recovery must be managed. In either case, pressurization is achieved by conventional means such as a pump, and a pressurized fluid reservoir may be useful in balancing fluid delivery. Volume and pressure regulation of convention varieties may be employed, so that volume and pressure are sufficient to allow correct operation when a large percentage of the stimulus points are activated.

Channels/interface 27 and/or 31 and 33 for working fluid must meet the needs for positioning of components (for example, source 25 of pressurized working fluid may be some distance from fingertip stimulator array 15), are selected to meet requirements for volume delivery while keeping pressure drop within specified bounds, and are designed for maximum volume/cross section, flexibility and durability.

Pressure-based stimulus at stimulus points 17 is accommodated by modulation of the flow of working fluid to the individual stimulus points 17 at modulator 29. Utilization of an array of microvalve actuators in a one to one relation with the number of stimulus points is the now preferred implementation of this modulation function. A highly compact array of electromechanical valves (Microelectromechanical systems, or MEMS, technology, for example) may be utilized. Since the valves need only be large enough to allow passage of sufficient working fluid to operate the stimulus points, the entire microvalve array 29 can be on the order of the area of stimulus point array 15 itself using currently available technology. The simplest and most reliable implementation would be one microvalve per stimulus point 17, with the microvalve array either placed very close to stimulus point array 15, remotely from array 15, or a combination thereof. The number and nature of channels/interface 27 and/or 31 and 33 will be determined by selected placement of microvalve array 29 relative to stimulus point array 15.

For one to one implementation, each microvalve in array 29 is selected to handle the volume of fluid flow needed to drive one stimulus point 17 (which in turn will depend upon the type of stimulus point deployed as hereinafter detailed). Alternatively, multiple smaller microvalves could be used for each stimulus point 17, thereby improving reliability of display array 15 by providing graceful degradation of performance in the event of failure of a single valve. Increased reliability can be further provided by use of valves that are normally closed unless activated, such valves being less likely to become jammed in the open position. As discussed further below, cost savings may be achieved using fewer valves and requiring each valve to drive several stimulus points 17 under control of a multiplex selection regime at control unit 41.

If the valves of modulator array 29 feature binary operation (either fully open or fully closed, with no intermediate positions) then the degree of pressure applied at stimulus points 17 may be controlled by temporal (time-based) modulation of the valves. Modulation techniques can include adjustment of duty cycle (the percentage of the time that each valve is open) or various other techniques in which the valves are very briefly pulsed to the open position many times per second and wherein the pressure applied (or felt) at a stimulus point 17 is determined by the number of pulses per unit of time. With temporal modulation techniques, it is highly desirable that no unintended vibration be apparent to the user (the threshold of sensitivity to vibration varies from person to person and depends on display parameters, but is generally in the area of several hundred Hertz). The switching speed of the valves is not the only factor to consider in avoiding unwanted vibration. If brief pulses are used as the modulation technique, then the pulses should be distributed relatively evenly over time so that there is not a significant low frequency component to the pressure signal delivered to stimulus points 17. The inclusion of a small storage reservoir between a valve in array 29 and a stimulus point 17 of array 15 (before lines 27 or incorporated with complex 33, for example) would tend to smooth out high frequency vibration components, which may be desirable for display systems that do not need high frequency operation.

Alternatively, variable pressure valves (valves having continuously variable fluid throughput capability), while more complex to manufacture and control, could be utilized to control pressure application at stimulus points 17. While the valves may include exhaust porting, fluid exhaust is preferably handled at stimulus points 17.

Figure 6:
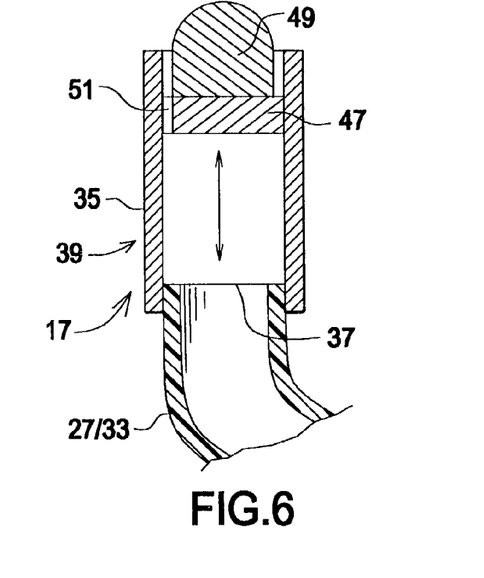
FIG. 6 is a sectional illustration of a first embodiment of a single stimulus point in accord with this invention.

Pressure-driven stimulus points 17 in array 15 may be implemented in several different ways. As shown in FIG. 6, plurality of pin assemblies 39 each including a cylinder 35 having a piston 47 with pin 49 mounted thereon may be used so that the working fluid (such as air) coming from modulator 29 passes into cylinder 35 through inlet 37 (from either lines 27 or at interface 33) and pushes piston 47 (and thus pin 49) part way out of cylinder 35, pressing pin 49 against the skin of the user with a pressure proportional to the average pressure of the working fluid applied to cylinder 35. When no working fluid is applied at inlet 37, leakage in cylinder 35 (in the case of air, for example, at exhaust passage 51 formed at piston 47, pin 49 having a diameter smaller that that of the piston), or slow return of working fluid through a control path (in the case of liquid) causes sufficient working fluid to escape cylinder 35 so that the resilience of the skin causes pin 49 on piston 47 to retract until it reaches the default position (whereat it will not apply significant pressure to the skin).

Figure 7:
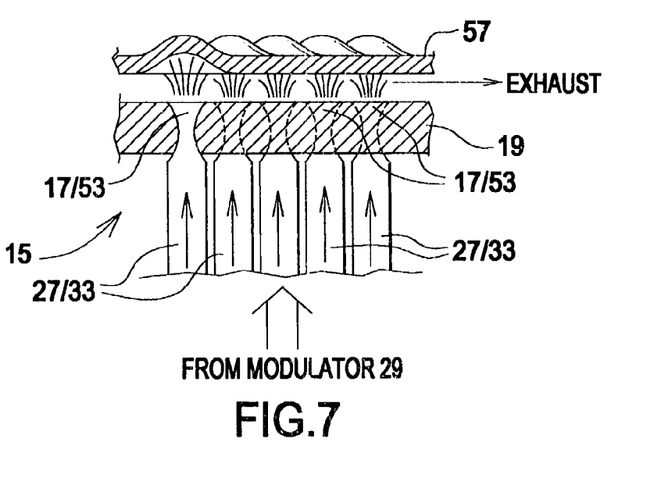
FIG. 7 is a sectional illustration of a second embodiment of deployment of stimulus points in accord with this invention.

Another embodiment of pressure-driven stimulus points 17 in array 15 is shown at FIG. 7. In this embodiment pins may be dispensed with entirely, working fluid (in this case, preferably a gas such as air) passing through openings 53 in matrix 19 shaped to direct flow and increase velocity (i.e., jets), the air flow directly impacting the user's skin. The low density of the gas and the presence of a lateral escape path means that high pressure of the gas and considerable volume flow are needed to produce a reasonably strong sensation. The pressure and volume needed is strongly dependent upon the spacing between matrix 19 of array 15 and the skin, and this spacing is partly dependent on the amount and pattern of pressure applied. A large volume of airflow through constricted openings 53 may also result in significant noise which must be muffled in the particular application. If liquid is utilized as the working fluid, such would require additional systems (fluid recovery and control, primarily, as shown below).

As further shown in FIG. 7, either of the above-described embodiments of the pressure-driven stimulus points 17 in array 15, and alternatively in addition thereto, could be deployed with flexible stretched membrane 57 interposed between stimulus points 17 and the user's skin. The flexible membrane is anchored at the edges of array 15, but is otherwise resiliently allowed to conform to a shape that balances the pressure of the stimulus and the pressure resulting from the resilience of the skin. This approach has the effect of smoothing out the effects of multiple stimulus points 17 over a wider area, and also directing the flow of spent working fluid, which in the case of liquid will simplify fluid recovery. When gas is used as a working fluid, this approach results in reduction in the pressure and flow rate needed for a given level of stimulus. Care in material selection and tautness of application will ensure that the spatial resolution of display array 15 is maintained at an acceptably high level.

Matrix 19 determines spacing of stimulus points 17 and also the surface over which the stimulus points will be applied, and a wide variety of materials for such purpose could be conceived and utilized. A flat matrix is simplest to implement, and is the most useful for representing a textured flat surface (for example, an accessibility application where the intention is to emulate the functionality of an extended flat tactile display). A curved matrix conforming more closely to the surface of a finger, for example, will cover a greater total area of the body location than a flat matrix providing the ability to portray a wider variety of tactile sensations. This capability would be particularly useful with data glove 23. In the design of a curved matrix, there is likely some benefit in choosing a nonuniform distribution and corresponding size of stimulus points, with the greatest concentration contacting the part of the body location (e.g., finger) that would be most likely to be contacted when touching a surface. Finally, a flexible matrix would permit dynamic wrapping of display array 15 around the body location, with the possibility of a tighter fit and more realistic sensations. In such case, flexing of the matrix must be accounted for.

Alternative approaches in design of the various elements of the apparatus of this invention may of course be utilized, particularly those related to alternate driving mechanisms (i.e., actuators such as the computer controlled valve array 29 shown hereinabove) for small scanned graphic displays wherein multiple stimulus points are controlled per actuator.

For example, the refresh rate of display 15 required depends on the level of performance needed (in terms of degree of realism and maximum lateral speed to be represented), and can be in the range of tens to hundreds of frames per second. A single stimulus generator (such as a computer controlled valve) with a bandwidth of tens of kHz or higher could be scanned across all of the tactile stimulus points 17 of display array 15. A more practical approach would be to use sufficient actuators to drive one row of stimulus points 17 in array 15 at a time, and to scan these actuators across all of the columns of the display array 15 (note that the distinction between a row and column is arbitrary in this context). In this manner, a twenty by twenty array as shown in FIG. 1 for example, could be driven using twenty actuators. Bandwidth of each actuator would generally be in the hundreds of Hz to kHz range. If display array 15 is built into a tracking device, a considerably larger volume is acceptable.

The direction of column scanning across the array can be always in one direction or back and forth (active both directions). Intensity modulation of stimulus points 17 can be done by varying the force applied at a stimulus point, varying the duty cycle of the stimulus at each stimulus point during each frame (i.e., scan), or by applying pseudorandom patterns of stimulus to the array that vary in successive frames, such that on the average every stimulus point 17 is driven the correct percentage of the time to give the stimulus intensity desired for that point 17.

Examples of driving methods that meet the requirements of this approach are high speed valves or injectors with pressurized working fluid, acoustic generators and the like. High speed valves or injectors put out bursts of working fluid representing the stimulus to each of a number of stimulus points 17 at array 15. Fluid must be diverted into separate channels by one of several scanning methods to permit separate control of individual stimulus points 17. The drivers must be capable of much faster operation (e.g., ten to twenty times faster) than the microvalves driving individual stimulus points in the preferred implementation described above. Such devices, however, are presently known and commercially available.

Acoustic generators, such as voice coils and piezoelectric tweeters, produce modulated acoustic energy. The necessary driving frequency for a row-scanned fingertip tactile display array 15 is within the frequency range of human hearing. Thus, stimulus energy could be generated by acoustic devices, and then distributed and transmitted via acoustic wave guides to the tactile stimulus points as transverse, rotational, or longitudinal shock waves. If desired, mechanical transducers (such as high frequency one-way valves that convert longitudinal pressure waves in a working fluid into bursts of fluid for transfer into a pressure chamber) at tactile stimulus points 17 can convert the acoustic signals into pressure-based stimulus, corresponding to the stimulus type described hereinabove.

Figure 8:
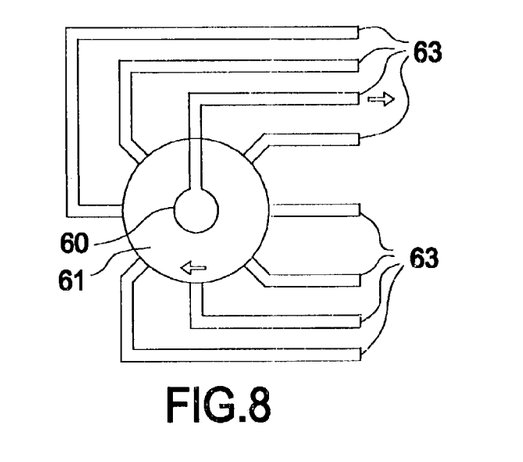
FIG. 8 is a schematic illustration of a rotational scanning device for actuation of a plurality of stimulus points in accord with this invention.

A number of scanning methods can be used in conjunction with such alternative driving methods to allow each actuator to drive multiple stimulus points 17. FIG. 8 illustrates rotational scanning wherein the outputs at 60 from each actuator or drive is received at rotational scanning device 61 which directs the output (e.g., flow of pressurized working fluid) to each of a number of output lines 63 in sequence. The outputs at lines 63 are directed to individual stimulus points 17. If desired, all of the rotational devices 61 can be mounted on a common driving shaft turned by one motor. For this and the other scanning methods herein, the timing of the signals from the actuators must take into account the propagation delay to array 15, so that the stimulus signals are delivered to the correct points 17 and thus to the correct points at the user's body.

Figure 9:
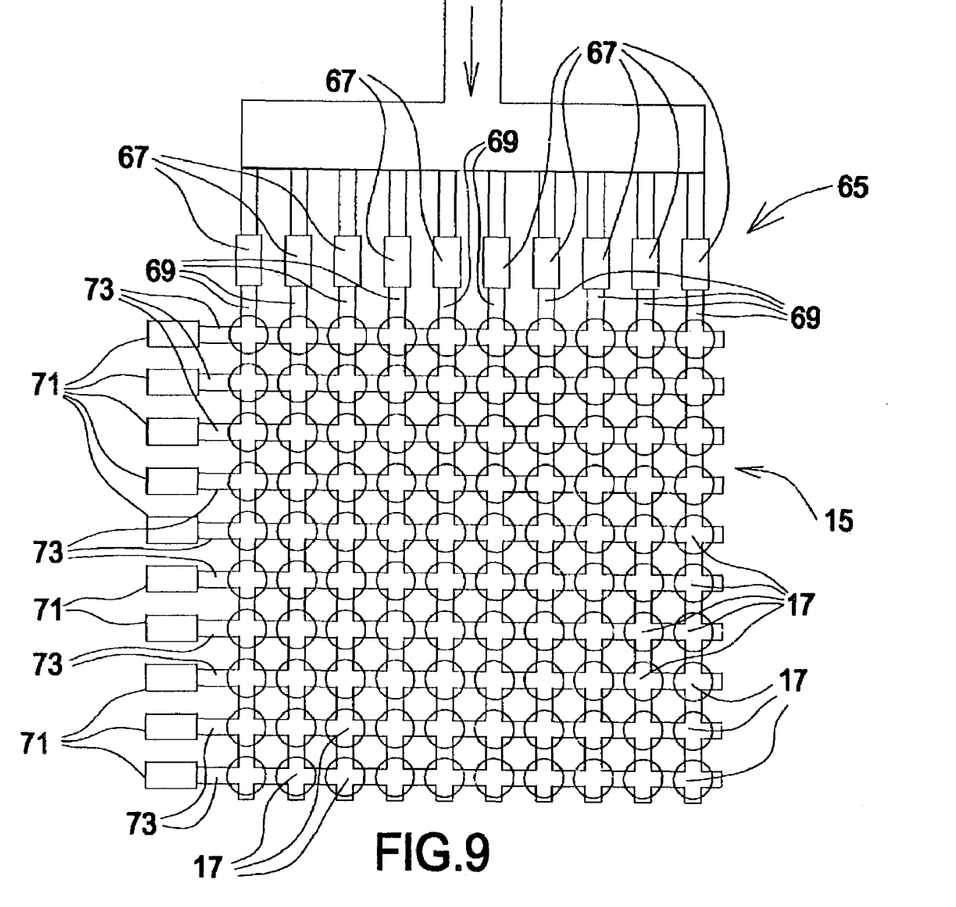
FIG. 9 is a schematic illustration of a fingertip tactile array with mechanical row selection.
Figure 10:
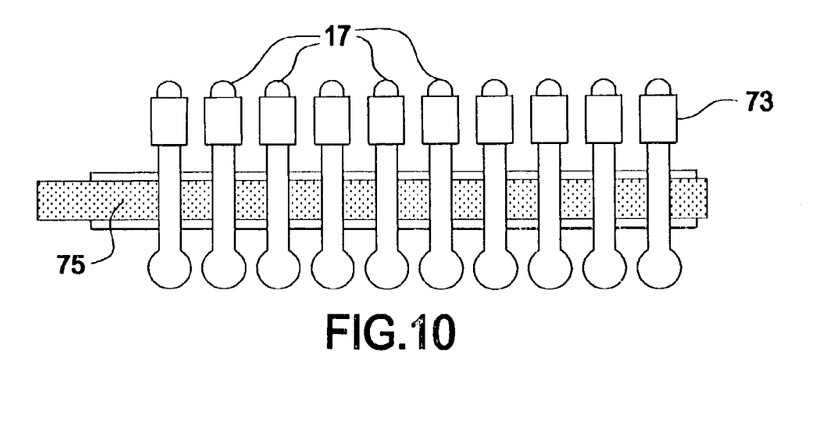
FIG. 10 is a schematic side view illustration of mechanical row select valves as illustrated in FIG. 9 with the row selected.
Figure 11:
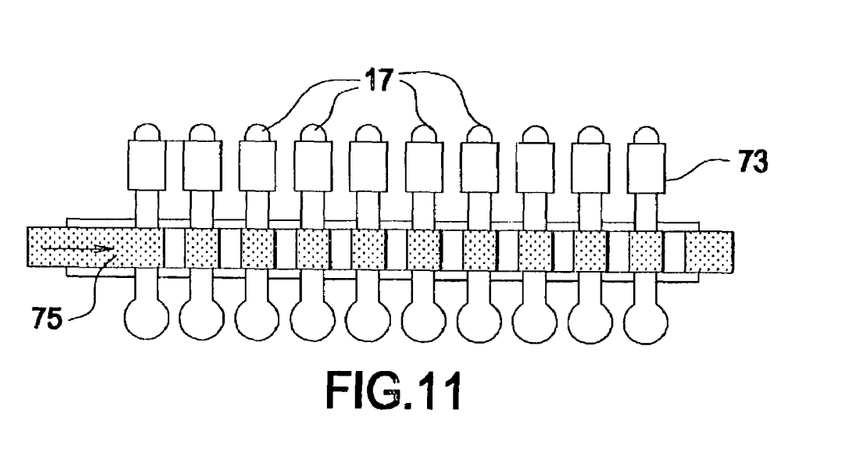
FIG. 11 is a schematic side view illustration of the mechanical row select valves as illustrated in FIG. 10 with the row deselected.

A one-dimensional array 65 of actuators 67 is shown in FIGS. 9 through 11. Actuator array 65 is coupled to columns 69 of stimulus points 17 of display array 15 and a second set of actuators 71 is provided to select rows 73 of stimulus points 17 of display array 15 one at a time, so that the actuators together operatively transfer signals (air pressure, for example) to the various stimulus points 17 of display array 15 one row 73 at a time. As shown in FIGS. 10 (wherein a row 73 is selected by an actuator 71) and 11 (wherein a row 73 is deselected by an actuator 71), for the case wherein each column actuator 67 controls flow of working fluid, actuators 71 turn on valve assemblies 75 serially thereby connecting the column actuators to each row in turn.

As another alternative, the outputs of the actuators could be coupled (using flexible links) to a device that scans back and forth across a two-dimensional array in order to drive all the stimulus points. The scanning device could use rigid pins (like the pins of a dot matrix printer head) to impact the stimulus array points 17 directly, or energy transfer can take place at mechanical transducers for activation via flow of a working fluid.

Since the tactile display apparatus of this invention are intended to provide a user with a realistic impression of a virtual object (which may or may not represent a real physical object), there are applications for which it is worthwhile to increase the sense of reality by providing additional cues to the senses of the user. In addition to the detailed tactile stimulus provided by array 15, and (if the application is a virtual reality or augmented reality system) the possible force feedback of a haptic system plus any visual or audio cues that may be present, other sensory inputs are utilizable with the apparatus of this invention. For example, application of lateral pressure to the fingertips or other body location can be supplied at array 15 to apply lateral force in selected direction to replicate the sensation of speed of movement over a surface, force of fingers against an object and/or the sensed friction of movement of the finger over a real object. Since real objects may be warmer or cooler than a fingertip or other body location, and may have different levels of latent heat and thermal conductivity, a simple thermal addition to the display apparatus of this invention may use heating or cooling to set the surface of display array 15 to a specified temperature. A more sophisticated system may more closely replicate the thermal properties of various substances by regulating the flow of heat into or out of the fingertip at array 15 as different virtual articles or environments are displayed.

In tactile graphic design there is a tradeoff between complexity of implementation and realism. Improved realism (making the experience using the display more like a real-life experience) may be desirable and (as heretofore suggested) implementable, but it is not necessary to have perfect realism for a display to be quite usable for most applications. Safety of such systems is also an issue. Most users will not want to actually be injured if the display apparatus is attempting to reproduce a pinprick. Designers may impose limits on the amount of force that a tactile graphic display stimulus point 17 may apply, on the "sharpness" of the application of force (the small-area differential in force applied to the skin), and possibly the magnitude, frequency and duration of vibrations applied to the skin. One factor that may influence designers is that reducing the magnitude of the forces applied to the skin by the display reduces the impact of the safety issues while also reducing cost of construction and operation.

When a fingertip display array 15 is integrated into a data glove 23 with force feedback, the forces applied to the skin by array 15 are superimposed over the forces applied by the haptic system. In a real world situation, the detailed textural information picked up by the finger may be thought of as a differential pressure signal that is proportional to the total pressure being applied to the skin. It will therefore increase the realism of the combined tactile/haptic system if the differential pressure applied by the tactile display array 15 is made to increase when the pressure applied by the haptic system increases. In the real world this would be a linear relationship. In a display system of this invention, the maximum pressure that can be applied by the tactile display may be considerably less than the maximum pressure that can be applied by the haptic system, so some other mapping function of haptic system force to tactile system pressure may be needed. For example, the relation may be linear at low force levels, then taper off toward the point at which the tactile display is exerting maximum differential pressure. Another approach is to keep the relationship linear until the tactile display reaches maximum output, then to keep the differential constant from that point on. Either approach can provide sufficient realism to make the tactile/haptic system useful. It should be noted that the pressure-based tactile display apparatus of this invention can achieve adjustment of the differential pressure either by modulation of the fluid flow to the individual stimulus points 17, by varying the pressure of the fluid to modulator 29, or a combination of both. The ability to vary the pressure of the fluid to the modulator may be particularly useful because it is adjusted for the entire localized body area in contact with array 15 in much the same way that the force to the body area by the haptic system is applied, and because it will not interfere with the modulator's ability to provide a wide range of forces to individual stimulus points 17.

Another design factor for data glove 23 applications is the thickness of the display structure. If the user initiates a motion that would bring two fingertips together (for example), then the thickness of the display limits the proximity of the two fingertips. Thus the display (i.e., matrix/stimulus points combination) should be as thin as possible and likely will require placement of modulator 29 remote from display array 15. Use of a multiplexing mechanism at the output from modulator 29 will permit a reduction in the number of fluid channels 27 from a remotely positioned modulator to array 15. Positional details of relative spacing between two opposed fingertips might be more important than absolute spacing provided that absolute spacing is not inhibited to the degree that it would interfere with positions and angles of the fingers. When creating a mental model of the dimensions of an object being grasped, the user may learn to ignore the thickness of the display apparatus at the body locale and concentrate on the differential signal provided by the display apparatus.

It is important to note that the output of the pressure-based tactile display apparatus of this invention is effectively a differential signal, whether or not it is combined with a haptic system. If the same force is applied to all the stimulus points 17, the perceived sensation will be much the same as when no force is applied to any of the stimulus points. This is a good match for detailed sense of touch in humans, which depends on differences in pressure and changes over time to collect tactile information. A display driving algorithm should, therefore, concentrate on such differentials applied at array 15 thereby minimizing power consumption while producing a useful tactile signal and providing a differential signal margin adequate to allow reasonable changes in what is being displayed over a short time interval. The driving algorithm must also take into account the maximum frequency and other capabilities of the apparatus, the degree of realism needed, and the texture and rate of change in motion of the virtual surface being displayed. The modulation frequency needed is increased by higher density of stimulus points 17, by increases in the number of intensity levels needed, by increases in the velocity of the virtual surface being displayed, and by the effort to avoid the unintended perception of vibration.

Methods that may be used in the display driving algorithm include implementation of multiple pressure levels by rapid sequencing of pseudorandom patterns so that each stimulus point is driven the correct fraction of the time, while any unintended vibration or motion felt by the user is minimized. For representation of very rapid lateral motion, the performance bandwidth of the tactile display may not be adequate to recreate the motion of a detailed surface with complete accuracy. However, the human sense of touch is unable to maintain full detail spatial resolution during rapid motion. The driving algorithm can take advantage of this limitation in human perception and produce a stimulus that, while lacking in the full detail and motion, conveys to the user enough information to produce a realistic sensation. Specific techniques may include driving only a subset of the total collection of tactile stimulus points 17 during rapid motion and skipping steps in the lateral propagation of patterns.

The refreshable scanning tactile graphic display apparatus and methods for localized sensory stimulation of this invention can be used in many applications. The display apparatus provides much of the functionality of a large-area refreshable tactile display in a smaller package and with a greatly reduced number of stimulus points. By integrating one or more fingertip arrays 15 into data glove 23, a detailed sense of touch can be added to the virtual environment, and integrated with existing haptic technology. The tactile display apparatus can be included in an augmented reality system that combines elements of the real world and virtual reality (for example, a robot manipulator device that is operated by remote control (teleoperation) can be equipped with pressure sensor arrays to give it a "sense of touch", signals from the arrays being relayed to a human operator using the apparatus of this invention, who then has tactile input, not merely sight, to guide operation of the manipulator). Fingertip tactile display apparatus of this invention can be put into the fingers of a protective suit, with sensors or mechanical linkages on the outside of the fingers of the suit to direct the driving of the display arrays, thereby providing the users of such suits with a more effective sense of touch for improved ergonomic design and more effective operation (many environmental isolation suits or pressure suits have gloves that protect the user from a hostile environment but that also significantly limit the sense of touch in the fingers). Other applications will be apparent from those disclosed hereinabove.

What is claimed is:

1. A method for localized sensory stimulation to tactilely simulate a virtual display comprising the steps of:
   providing for delivery of stimulus at a high density set of points at a selected body location of a user;
   modulating said stimulus delivery at different said points for selective actuation including applying variable differential pressure stimulus at said points; and
   controlling said modulation responsive to selected input to control which portion of the virtual display should be tactilely simulated at said points to simulate a sensation of lateral motion across the selected body location thereby to communicate to the user a detailed impression of either movement of a patterned surface across the selected body location or movement of the selected body location across the patterned surface without relative movement between said set of points and the selected body location of the user.

2. The method for localized sensory stimulation of claim 1 wherein the step of controlling said modulation includes applying differential force signals to represent tactile information.

3. The method for localized sensory stimulation of claim 1 wherein stimulus delivery is by a working fluid application at said points, the step of controlling modulation of stimulus delivery at different said points including at least one of causing varying pressure of said working fluid before modulating said stimulus delivery, causing selective temporal modulation of working fluid application at said points, and causing selective working fluid throughput operation to each of said points.

4. The method for localized sensory stimulation of claim 1 wherein stimulus delivery is by one of piston operated pins and fluid jets equal in number to said points.

5. The method for localized sensory stimulation of claim 1 wherein stimulus delivery is by piston operated pins, said method further comprising providing a stimulus neutral position for said pins, user's skin elasticity employed to return said pins to said stimulus neutral position.

6. The method for localized sensory stimulation of claim 1 further comprising sensing selected body position information and utilizing said information as said selected input for controlling said modulation to thereby control speed and direction of virtual display scanning.

7. The method for localized sensory stimulation of claim 1 wherein said set of points at a selected body location of a user includes about 400 stimulus points in about one square centimeter.

* * * * *